Oct. 27, 1953   A. S. WATKINS ET AL   2,656,569
INJECTION MOLDING APPARATUS
Filed March 15, 1951

*INVENTORS*
ARTHUR S. WATKINS &
GEORGE L. WARSACK
BY
*Hyde, Meyer, Baldwin & Doran*
ATTORNEYS Patented Oct. 27, 1953

2,656,569

UNITED STATES PATENT OFFICE 2,656,569

INJECTION MOLDING APPARATUS

Arthur S. Watkins and George L. Warsack, Port Clinton, Ohio, assignors to Produx Corporation, Port Clinton, Ohio, a corporation of Ohio Application March 15, 1951, Serial No. 215,840

4 Claims. (Cl. 18—30)

This invention pertains to injection molding apparatus and more particularly to a feeding head for such apparatus by means of which a mass of plastic material may be introduced under pressure into a mold cavity.

An object of the invention is to provide a feeding head which may be used in conjunction with a plurality of molds which are successively used and re-used.

Another object is to provide a feeding head having a positionable element therein whereby to direct the flow of plastic material to any one of a plurality of molds.

Another object is to provide a feeding head in which plastic material is advanced by means of a screw conveyor and forced through a nozzle-like element and a positionable sleeve valve into one of a plurality of moldsprues.

Another object is to provide such a device in which a cylindrical valve structure is axially positionable to determine which of a plurality of molds shall receive a charge of plastic material.

Another object is to provide a feeding head in which a positionable sleeve valve is moved axially by fluid power means.

Figure 1:
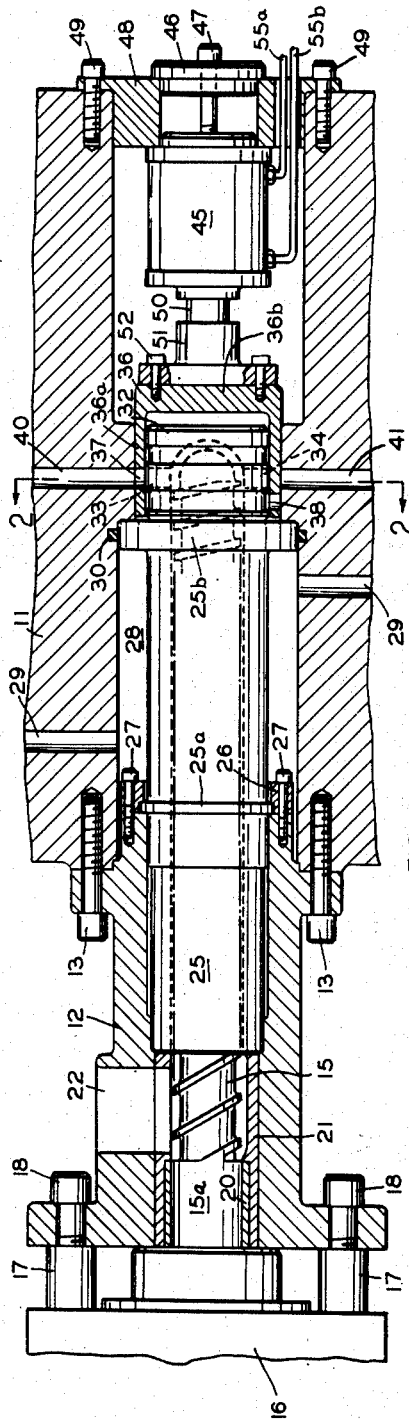
Figure 2:
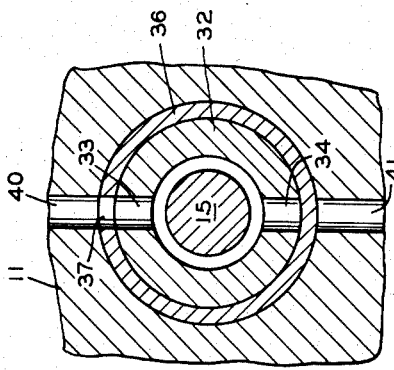

Further objects and advantages will become apparent from the following description of a preferred embodiment of the invention taken in conjunction with the drawing, in which Fig. 1 is a longitudinal sectional view, and Fig. 2 is a vertical sectional view taken on the line 2—2 of Fig. 1.

Figure 3:
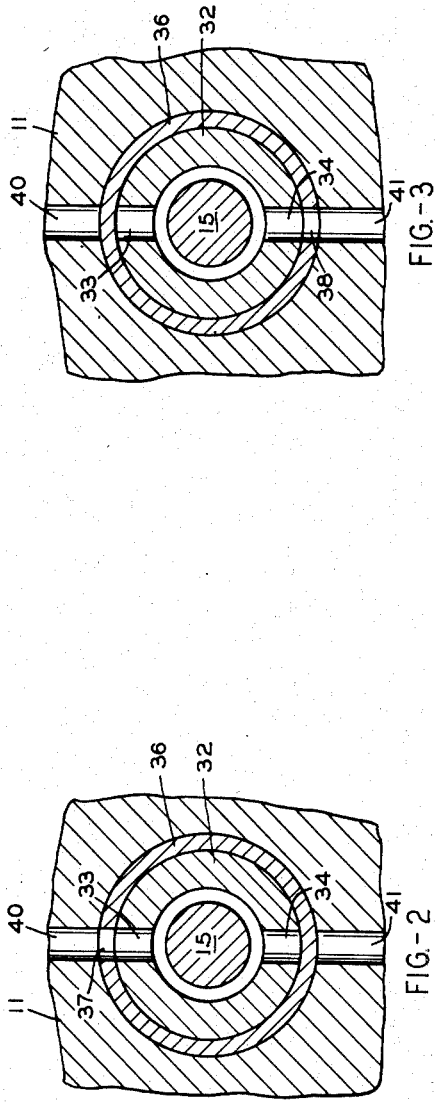

Fig. 3 is a vertical sectional view similar to Fig. 2, but showing the sleeve valve in another position.

The preferred embodiment of the invention hereinafter described is adapted to operate in conjunction with two molds. However, this is not to be construed as a limitation since, as will be pointed out, the invention may be easily adapted for use with any number of molds. Furthermore, it is to be understood that the terms and phrases used to describe the preferred embodiments illustrated herein are descriptive and illustrative only and are not to be construed as limiting the invention.

Speaking first generally, the invention relates to a screw conveyor which advances plastic material from a feed hopper through a fixed nozzle and a positionable valve into one of a plurality of molds. The valve, in this case, is a sleeve-like member having sprues which may be aligned one at a time with corresponding sprues in the nozzle. The axial position of the sleeve valve determines which pair of sprues are aligned and therefore which mold will be fed.

The body portion of the feeding head comprises a casting 11 to which a housing or barrel 12 is attached by means of the bolts 13. A screw conveyor 15 is rotated by a transmission mechanism, designated generally by the numeral 16, and extends into a longitudinal bore through both the housing 12 and the casting 11. Power means (not shown) is, of course, provided to drive the transmission mechanism 16. Spacers 17 and bolts 18 retain the transmission mechanism in the proper position with respect to the housing 12, and the conveyor 15 is supported within the housing by a sleeve bearing 20 which surrounds the smooth portion 15a of the conveyor and which in turn is retained within a sleeve 21. An aperture 22, which extends through both the housing 12 and the sleeve 21, provides means by which plastic material may be fed from a hopper (not shown) into the screw conveyor.

The screw conveyor 15 is surrounded by a fixed sleeve 25 whose internal diameter is just slightly larger than the major diameter of the screw conveyor. The sleeve is securely attached to the housing 12 by means of a clamping ring 26, which cooperates with a flange 25a on the fixed sleeve 25, and bolts 27. Space is provided between the sleeve 25 and the casting 11 which may, if desired, be used as a water jacket 28 to which water lines 29 extend through the casting 11. Water is retained within the jacket 28 between the previously mentioned clamping ring 26 and a flange 25b which is surrounded by a seal 30.

The sleeve 25 terminates at its forward end in a portion 32 which is hereinafter referred to as a nozzle, merely for descriptive purposes. The nozzle may, if desired, be made separately and attached to the sleeve or, as in this case, the two may be constructed integrally. As readily seen from Fig. 1, plastic material fed into the rear portion of the screw conveyor 15 through the aperture 22 will be advanced thereby into the nozzle 32. Two sprues 33 and 34 extend through the nozzle and, in this embodiment, are diametrically opposed. Surrounding the nozzle and axially slidable thereon is a sleeve valve 36 having a cylindrical wall 36a and an end wall 36b. Two sprues 37 and 38 extend through the side wall 36a and are individually registerable with the nozzle sprues 33 and 34, respectively. As is readily seen, the sprues 37 and 38 are not diametrically opposed, but are axially slightly offset from each other. Therefore, when the sprues 33 and 37 are aligned or registered (as seen in Fig. 2), the sprues 34 and 38 are not so positioned, and when the sleeve 36 is moved to the right (as seen in Fig. 1) the sprues 34 and 38 are registered but the sprues 33 and 37 are not (as seen in Fig. 3). Sprues 40 and 41 extend through the casting 11 and are permanently aligned with the nozzle sprues 33 and 34, respectively. Thus the sleeve valve 36 serves in a manner similar to a shutter or gate to connect either the sprues 33 and 40 or the sprues 34 and 41. The casting sprues 40 and 41 lead to molds (not shown) as is obvious to one skilled in the art.

Means are provided to position the sleeve valve 36 axially and, in this case, comprise a fluid power cylinder 45, retained in position in the casting 11 by a locking cap 46 and bolt 47 which clamp the cylinder to a ring 48. Bolts 49 attach the ring 48 to the casting 11. The piston rod or shaft 50 of the cylinder 45 has mounted thereon a disk-like element 51 which is attached by the bolts 52 to the end wall 36b of the sleeve valve. Fluid lines 55a and 55b extend through the ring 48 to a control valve of any suitable well-known type by means of which an operator can control the entrance of fluid to the cylinder 45.

Assuming that the mold connected to the casting sprue 40 is being fed, the operation is as follows:

Plastic material is fed from the feed hopper through the aperture 22 to the screw conveyor 15 and advanced to the nozzle 32 by means of the action between the rotating conveyor and the fixed sleeve 25. Since the sleeve valve 36 is in the position shown in Figs. 1 and 2, the plastic material is forced through the nozzle sprue 33, the sleeve valve sprue 37, and casting sprue 40 into the mold. When the operator determines that the mold is properly filled, he operates a control valve (not shown) which causes the cylinder 45 to shift the sleeve valve axially to the right (as seen in Fig. 1) and thereby cut off the flow of plastic material through the casting sprue 40. As seen in Fig. 3, when the sleeve is shifted, the path is opened through the nozzle sprue 34, the sleeve valve sprue 38, and the casting sprue 41 to the other mold. While this mold is being filled, the material in the first mold is being cured and removed so that the process may be repeated continuously.

It is apparent from the foregoing description that the invention may be adapted for use with any reasonable number of molds. Such adaptation would comprise providing the proper number of sprues in the nozzle 32 and corresponding sprues in the sleeve valve 36. Fluid power positioning means would be provided to axially align the nozzle sprues and the sleeve sprues in pairs in the same manner as previously described.

Various other changes and adaptations such, for example, as arrangement and detail of parts, may be made by one skilled in the art without departing from the spirit of the invention or the scope of the appendant claims.

What is claimed is:

1. In an injection molding apparatus, a feeding head comprising a screw conveyor, a fixed sleeve surrounding said screw conveyor and having a nozzle portion provided with a plurality of spaced sprues, a sleeve valve surrounding said nozzle portion and being provided with a plurality of spaced sprues each of which is registerable with one said nozzle portion sprue, and means adapted to position said sleeve valve in any one of a plurality of predetermined positions to register one only of said sleeve valve sprues with one said nozzle sprue.

2. In an injection molding apparatus, a feeding head comprising a screw conveyor, a fixed sleeve surrounding said screw conveyor and having a nozzle portion provided with a plurality of spaced sprues, a sleeve valve surrounding said nozzle portion and being axially slidable thereon, said sleeve valve being provided with a plurality of spaced sprues each of which is registerable with one said nozzle portion sprue, and means adapted to position said sleeve valve in any one of a plurality of predetermined positions to register one only of said sleeve valve sprues with one said nozzle sprue.

3. In an injection molding apparatus, a feeding head comprising a screw conveyor, a fixed sleeve surrounding said screw conveyor and having a nozzle portion provided with a plurality of spaced sprues, a sleeve valve surrounding said nozzle portion and being provided with a plurality of spaced sprues each of which is registerable with one said nozzle portion sprue, and positioning means comprising a fluid power cylinder adapted to position said sleeve valve in any one of a plurality of predetermined positions to register one only of said valve sprues with one said nozzle sprue.

4. In an injection molding apparatus, a feeding head comprising a screw conveyor rotatably mounted within a fixed sleeve, said sleeve having a nozzle portion enclosing the tip of said screw conveyor and having therein a plurality of spaced sprues, a sleeve valve surrounding said nozzle portion and being slidable axially thereon, said sleeve valve being provided with a plurality of spaced sprues each of which is registerable with one said nozzle sprue, and means to axially position said sleeve valve whereby to align in each of a number of predetermined positions one pair only of said nozzle and sleeve valve sprues.

ARTHUR S. WATKINS.
GEORGE L. WARSACK.

References Cited in the file of this patent

UNITED STATES PATENTS

| Number | Name | Date |
| --- | --- | --- |
| 1,760,902 | Grattan | June 3, 1930 |
| 1,791,613 | Clay | Feb. 10, 1931 |
| 1,960,515 | Shield | May 29, 1934 |
| 2,367,319 | Wahlberg | Jan. 16, 1945 |